(12) United States Patent
Mizutani et al.

(10) Patent No.: US 9,430,056 B2
(45) Date of Patent: Aug. 30, 2016

(54) POINTING DEVICE FOR A PORTABLE COMPUTER

(71) Applicant: LENOVO (SINGAPORE) PTE. LTD., Singapore (SG)

(72) Inventors: Akihiko Mizutani, Kanagawa-Ken (JP); Fusanobu Nakamura, Kanagawa-Ken (JP); Mitsuhiro Yamazaki, Kanagawa-Ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 58 days.

(21) Appl. No.: 14/337,455

(22) Filed: Jul. 22, 2014

(65) Prior Publication Data

US 2015/0042565 A1    Feb. 12, 2015

(30) Foreign Application Priority Data

Aug. 9, 2013   (JP) ................................. 2013-165702

(51) Int. Cl.
   *G06F 3/033*   (2013.01)
   *G06F 3/0338*   (2013.01)
   *G06F 3/02*   (2006.01)

(52) U.S. Cl.
   CPC ........... *G06F 3/0338* (2013.01); *G06F 3/0213* (2013.01)

(58) Field of Classification Search
   CPC ............................ G06F 3/0213; G06F 3/0338
   USPC ........................................................ 345/160
   See application file for complete search history.

(56) References Cited

U.S. PATENT DOCUMENTS

| | | | | |
|---|---|---|---|---|
| 6,040,821 A | * | 3/2000 | Franz | G06F 3/0213 345/157 |
| 6,184,865 B1 | * | 2/2001 | Zimmerman | G06F 3/038 345/160 |
| 2001/0003326 A1 | * | 6/2001 | Okada | G01L 5/165 200/516 |
| 2003/0206154 A1 | | 11/2003 | Hill et al. | |
| 2004/0052016 A1 | * | 3/2004 | Takagi | G06F 3/038 361/51 |
| 2004/0104727 A1 | * | 6/2004 | Morimoto | G01D 5/2417 324/409 |
| 2004/0201606 A1 | * | 10/2004 | Ito | G06F 3/0213 715/702 |
| 2005/0252303 A1 | * | 11/2005 | Taniguchi | G06F 3/0338 73/780 |

(Continued)

FOREIGN PATENT DOCUMENTS

| | | |
|---|---|---|
| JP | 02-222019 | 9/1990 |
| JP | 06-309095 | 11/1994 |

(Continued)

*Primary Examiner* — Adam J Snyder
(74) *Attorney, Agent, or Firm* — Antony P. Ng; Russell Ng PLLC

(57) ABSTRACT

A pointing device for a portable computer is disclosed. The pointing device includes an operation cover for covering a first and second pressure sensors. The pointing device also includes one front operation surface and two rear pressure faces. Detection axes are arranged in a vertical direction, and the pressure faces are so inclined that normal lines will approach each other above the operation surface. The operation surface is applied with depression pressure P1 including a horizontal component Ph and a vertical component Pv. Even when any position on the operation surface is pressed down, pressure P2a detected by the first pressure sensor becomes greater than pressure P3a detected by the second pressure sensor.

5 Claims, 9 Drawing Sheets

(56) References Cited

U.S. PATENT DOCUMENTS

| | | | | |
|---|---|---|---|---|
| 2009/0051371 | A1* | 2/2009 | Morimoto | G06F 3/0338 324/661 |
| 2009/0194404 | A1* | 8/2009 | Kubo | G06F 3/0414 200/5 D |
| 2010/0026626 | A1* | 2/2010 | Macfarlane | G06F 3/0213 345/157 |
| 2010/0134428 | A1* | 6/2010 | Oh | G06F 3/03547 345/173 |
| 2010/0149124 | A1* | 6/2010 | Kim | G06F 3/0416 345/173 |
| 2011/0043491 | A1* | 2/2011 | Oh | G06F 3/0234 345/177 |
| 2012/0068929 | A1 | 3/2012 | Kim | |
| 2012/0287053 | A1* | 11/2012 | Bos | G06F 3/03547 345/173 |

FOREIGN PATENT DOCUMENTS

| | | |
|---|---|---|
| JP | 09-230998 | 9/1997 |
| JP | 09-244801 | 9/1997 |
| JP | 11-134108 | 5/1999 |

* cited by examiner

POINTING DEVICE FOR A PORTABLE COMPUTER

PRIORITY CLAIM

The present application claims benefit of priority under 35 U.S.C. §§120, 365 to the previously filed Japanese Patent Application No. JP2013-165702 with a priority date of Aug. 9, 2013, which is incorporated by reference herein.

BACKGROUND OF THE INVENTION

1. Technical Field

The present invention relates to pointing devices in general, and particularly to a pressure sensor type pointing device for moving a cursor on a computer screen.

2. Description of Related Art

A pointing device of a computer generates a signal for moving a mouse pointer (cursor) displayed on a screen according to a user's operation. In general, pointing devices include a pointing stick as well as a mouse and a touch-pad. The pointing stick is also called Track Point® and is provided among keys on a keyboard. The pointing stick is mainly employed in a laptop personal computer (laptop PC) because the pointing stick can be operated with fingers in a home position. The pointing stick requires no operation space unlike the mouse, and it is easy to operate even while keeping a computer on the user's lap in a car or a train.

A pressure sensor type and a strain gauge type are known as detection principles of the pointing stick. For example, in one prior art, pressure is applied to four pressure sensors placed in a cross shape via a plate tiltable about a support rod to generate a signal corresponding to the direction and magnitude of moving a cursor. The center of a button is recessed like a dish so that, when a finger is slid horizontally in any direction while placing the fingertip in the center of the button, the finger will naturally presses peripheral parts of the button to enable an operation with a feeling of moving the button horizontally rather than pressing the button.

Another prior art discloses a pointing device in which a force in a horizontal direction is applied to an operation lever to change the resistance of four pressure-sensitive rubber materials arranged around the operation lever in a cross shape in order to detect the direction and magnitude of the force. Yet another prior art discloses a pointing device in which a force is applied to a finger operating part from above in a position deviated from an axial line, where the finger operating part is coupled to the top of a stem supported by a ball bearing, to obtain a signal corresponding to the moving direction and moving speed of a cursor by means of piezoelectric elements arranged in four directions.

Since many strain gauge type pointing sticks have been adopted so far, users are familiar with the operational feeling. FIG. 13 is a sectional view for describing the structure of a strain gauge type pointing stick 10 employed in a laptop PC. A membrane sheet 25 with key switches formed thereon is laminated on the upper surface of a metal plate 27. Multiple keys 21, 23 and the pointing stick 10 are fixed to the metal plate 27. The pointing stick 10 includes a ceramic operation post 13, a cap 11 attached to the operation post through an intermediate member 15, and a printed circuit board (PCB) 17 on the reverse side of which a strain gauge is pasted in an X direction and a Y direction.

The cap 11 is formed out of a soft material such as silicon rubber. The PCB 17 mounts thereon an operational amplifier, a processor, and the like to convert a change in electrical resistance of the strain gauge into voltage, and further to generate a digital signal corresponding to the moving direction of a cursor and the amount of travel per unit time according to the direction and magnitude of a force applied to the operation post 13. The PCB 17 is covered with a shield cover 19.

In the pointing stick 10, the crown of the cap 11 as an operation surface is flush with or projects slightly beyond the faces of the keys 21 and 23. Since the cap 11 is surrounded by three keys, including the keys 21 and 23, only the crown of the cap 11 becomes the finger-operating surface. When the operation surface of the cap 11 is applied with a force including a vertical component needed to obtain a frictional force and a horizontal component to determine the moving direction, the PCB 17 is distorted. At this time, the mouse cursor can be moved in the direction of the horizontal component even if the finger applies the force to any position on the operation surface.

Since the height of the cap 11 affects the thickness of a laptop PC, the pointing stick 10 is required to reduce the height from the shield cover 19 to the crown of the cap 11 in order to make the laptop PC thinner. However, since there is a need to apply a greater force to the cap 11 to give a predetermined strain as the operation post 13 and the cap 11 are shortened, the operability is degraded. Even if the signal amplification factor is increased to operate with a weak force, it is limited due to the influence of noise. On the other hand, even if the thickness of the PCB 17 is reduced to make the PCB 17 flexible, this is also limited because the PCB 17 becomes fragile.

Even when the pressure sensor type is employed, it is desired that the operational feeling should be equivalent to that of the strain gauge type. However, since a force in the vertical direction is applied to a pressure sensor positioned in the moving direction of the mouse cursor in the above-mentioned methods, there is a need to select a depressing position on the operation surface. Therefore, the operational feeling becomes different from the strain gauge type pointing stick 10 that moves the mouse cursor in the direction of the horizontal component regardless of the depressing position. Further, the method of applying a force in the horizontal direction to a side face of the operation lever cannot make the laptop PC thinner because of the need to lengthen the operation post so that it will project from keycaps.

Consequently, it would be preferable to provide a pressure sensor type pointing device capable of furnishing an operational feeling similar to a strain gauge type pointing stick.

SUMMARY OF THE INVENTION

In accordance with a preferred embodiment of the present invention, a pointing device includes multiple pressure sensors, each having a detection axis and arranged in a radial manner about an original point; an operation surface operated by applying depression pressure including a horizontal component and a vertical component; and multiple pressure faces, each of which is arranged to correspond to each pressure sensor and displaced according to the horizontal component of the depression pressure applied to the original point, so that each pressure sensor can be applied with different pressure according to the direction and magnitude of the horizontal component. When the depression pressure that presses down the original point includes a horizontal component, since each pressure sensor arranged in the direction of the horizontal component detects different pressure, the system can generate a signal for moving a mouse cursor in the direction of the horizontal component. The pressure sensor may be or may not be arranged in the direction of the horizontal component.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1A:
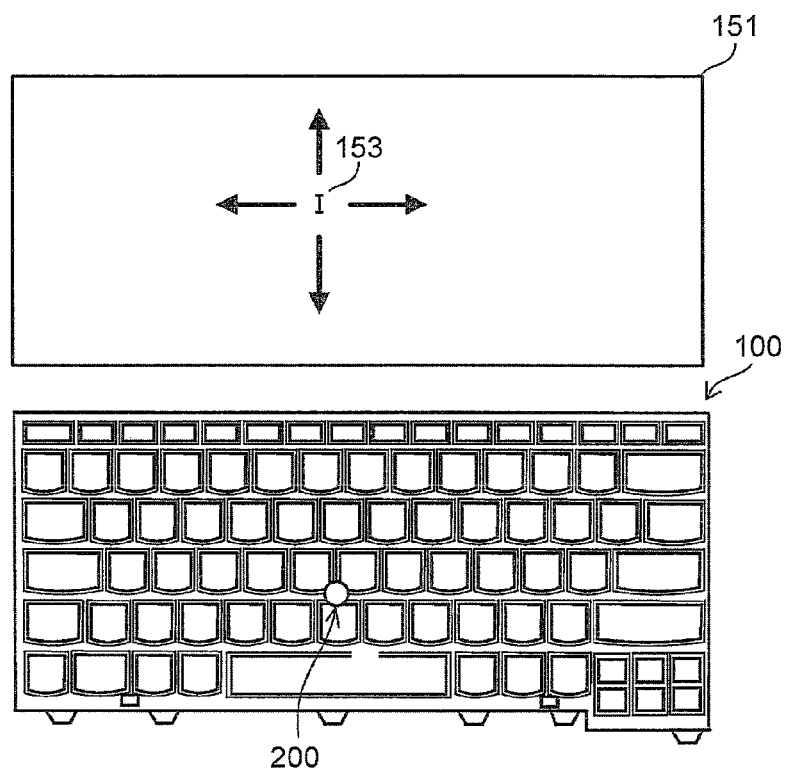
FIGS. 1A-1B depict a pressure sensor type pointing device installed in a laptop PC.
Figure 1B:
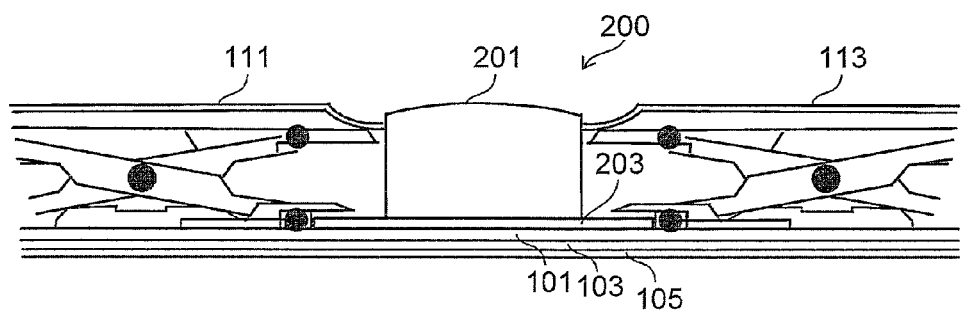

FIG. 1 contains views for describing an outline of a pressure sensor type pointing device installed in a laptop PC. FIG. 1A is a view schematically describing the laptop PC, showing the plane of a keyboard assembly 100 and an LCD 151 with a mouse cursor 153 displayed thereon. FIG. 1B is a side view showing a surrounding area of a pointing device 200. The pointing device 200 is arranged roughly in the center of the keyboard assembly 100 so that the pointing device 200 can be operated with an index finger while placing fingers in the home position.

The keyboard assembly 100 is so formed that a membrane sheet 101 in which key switches corresponding to respective keys are embedded is laminated on the upper surface of a metal plate 103 with a waterproof sheet 105 pasted on the lower surface. Each key is fixed to the metal plate 103. The pointing device 200 includes multiple pressure sensors (not shown), an operation cover 201, and a PCB 203. The PCB 203 is fixed to the metal plate. The crown of the operation cover 201 can be flush with or made lower than the top faces of keys 111 and 113. The operation cover 201 is surrounded by three keys including the keys 111 and 113, and since the finger does not enter the side faces, only the crown becomes an operation surface.

Figure 13:
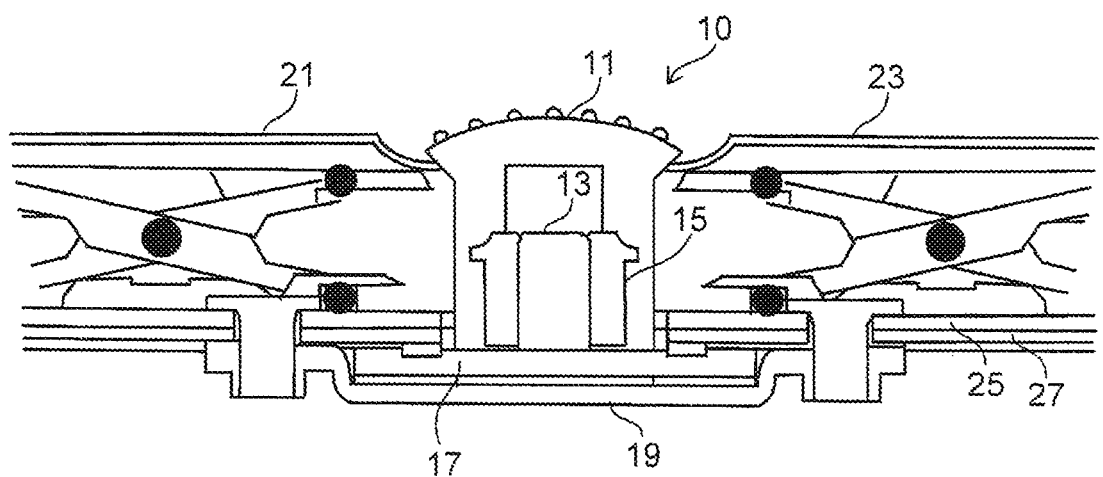
FIG. 13 is a sectional view for describing the structure of a conventional strain gauge type pointing stick.

In order to apply a force in a horizontal direction to the operation surface, a force in a vertical direction is also needed to generate friction between the finger and the operation surface. In the strain gauge type pointing stick described with reference to FIG. 13, a mouse cursor 153 can be moved in any direction of a horizontal component of depression pressure applied to the cap 11. +X direction, −X direction, +Y direction, and −Y direction of the horizontal component with respect to the operation cover 201 correspond to rightward, leftward, upward, and downward movements of the mouse cursor 153, respectively.

Figure 2A:
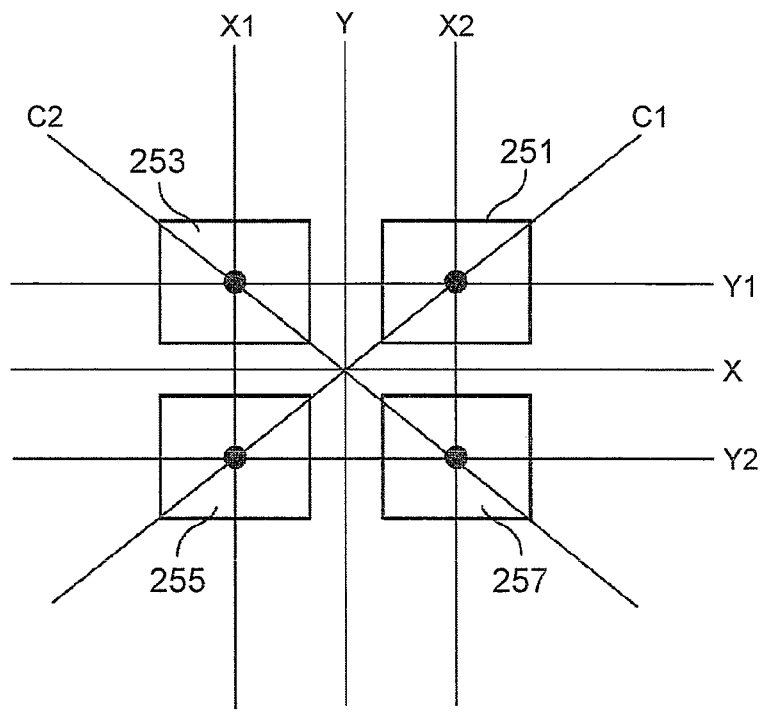
FIGS. 2A-2C illustrate the arrangement of pressure sensors.
Figure 2B:
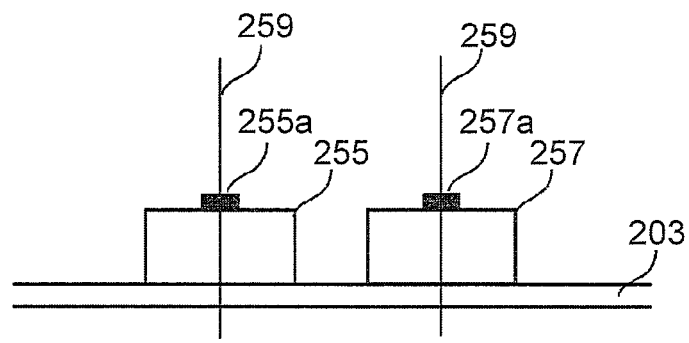
Figure 2C:
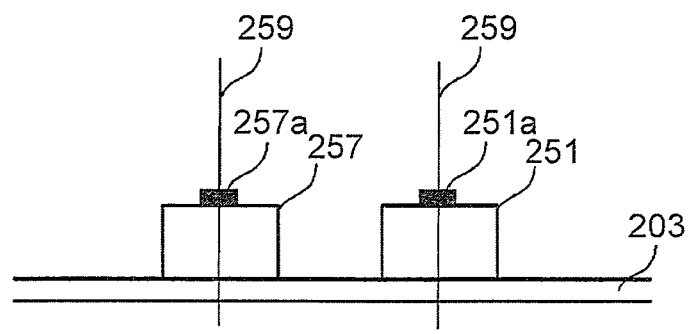
Figure 3A:
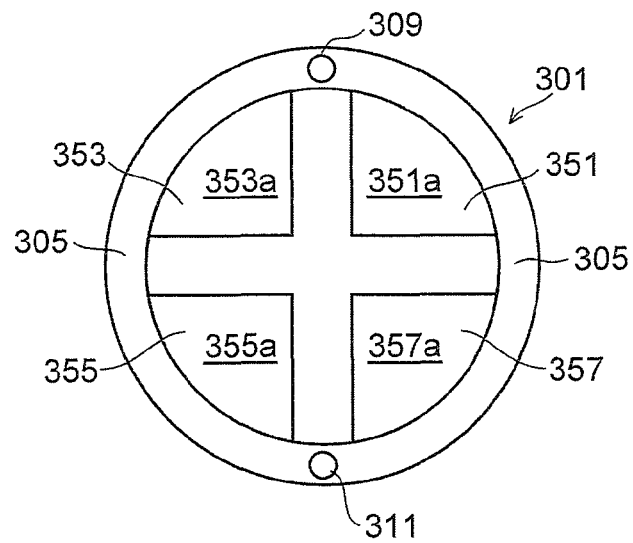
FIGS. 3A-3D show the structure of a pressure sensor type pointing device.
Figure 3B:
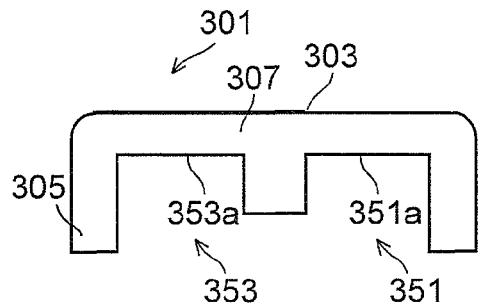
Figure 3C:
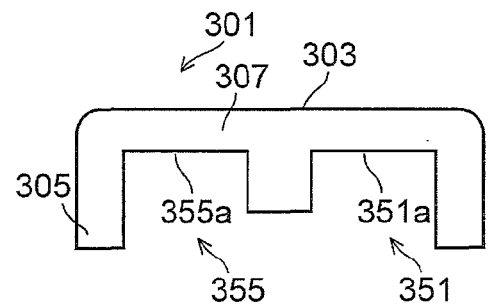
Figure 3D:
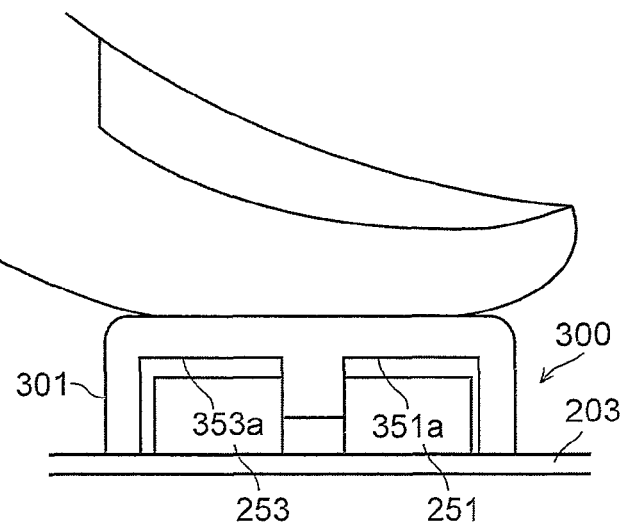

FIG. 2 contains views for describing the arrangement of pressure sensors mounted on the PCB 203. FIG. 2A is a plan view, and FIG. 2B and FIG. 2C are side views. Although the number of pressure sensors is not particularly limited as long as the number is three or more, it is desired to select the number in a range between three to five in terms of the space and cost. FIG. 2 shows four pressure sensors 251 to 257 as an example. In the present invention, piezoelectric elements can be employed as an example, though there is no need to particularly limit the principles of the pressure sensors 251 to 257.

Each of the pressure sensors 251 to 257 includes a piezoelectric element in a cubic case to output a voltage signal corresponding to pressure applied to each of rods 251a to 257a along the direction of a detection axis 259. Identically-standardized pressure sensors are employed for all the pressure sensors 251 to 257. In the embodiment, the pressure sensors 251 to 257 are arranged in a radial manner to position the detection axis 259 symmetrically with respect to the original point from the first quadrant to the fourth quadrant of the X-Y coordinates. The pressure sensors 251 and 253 are disposed on a line Y1 parallel to the X axis, and the pressure sensors 255 and 257 are disposed on a line Y2 parallel to the X axis.

Further, the pressure sensors 251 and 257 are disposed on a line X2 parallel to the Y axis, and the pressure sensors 253 and 255 are disposed on a line X1 parallel to the Y axis. The interval between an adjacent pair of pressure sensors in the X direction and the Y direction are all equal to each other. The PCB 203 mounts a logic circuit thereon to generate a digital coordinate signal from analog voltage signals output from the four pressure sensors 251 to 257. The coordinate signal is a signal for defining relative coordinates of the mouse cursor, including a signal for causing the system to determine the moving direction of the mouse cursor 153 from the output of the four pressure sensors 251 to 257, and a signal for determining the amount of travel (moving speed) per unit time.

FIG. 3 contains views for describing the structure of a pressure sensor type pointing device 300 mountable as the pointing device 200 in FIG. 1. The pointing device 300 is made up of an operation cover 301, the pressure sensors 251 to 257 arranged as in FIG. 2, and the PCB 203. FIG. 3A is a plan view of the reverse side of the operation cover 301 as seen from the side of the PCB 203, FIG. 3B is a sectional view taken along the line Y1 (FIG. 2), FIG. 3C is a sectional view taken along the line C1 (FIG. 2), and FIG. 3D is a sectional view of the pointing device 300 to show a state where the pointing device 300 with the pressure sensors 251 to 257 covered with the operation cover 301 is operated with a finger. The operation cover 301 is formed out of aluminum alloy as an example, where an operation surface 303 is formed on the front face of a ceiling part 307, and pressure faces 351a to 357a for applying pressure to rods 251a to 257a of the pressure sensors 251 to 257 are formed on the reverse face.

When the operation cover 301 is mounted on the PCB 203, the pressure faces 351a to 357a are planes parallel to the PCB 203 or perpendicular to the detection axis 258. In this specification, description will be made on the assumption that the front face of the PCB 203 and the front face of the operation surface 303 are horizontal planes. A leg part 305 extends from the circumference of the ceiling part 307. The inner wall of the leg part 305 and the pressure faces 351a to 357a form storage parts 351 to 357 for storing the pressure sensors 251 to 257. Tapped screw holes 309 and 311 are formed in the leg part 305 to fix the operation cover 301 to the PCB 203.

The leg part 305 is fixed with screws through spring washers from the reverse face of the PCB 203 to get rid of a gap between the pressure faces 351a to 357a and the pressure-receiving faces of the rods 251a to 257a. When the operation cover 301 is fixed, slight and roughly uniform pressure is applied to the pressure sensors 251 to 257 to be able to show great sensitivity to slight displacement of the pressure faces 351a to 357a under the pressure applied to the operation surface 303. The operation cover 301 is manufactured to be symmetrical to the axes that pass through the original point.

Figure 4A:
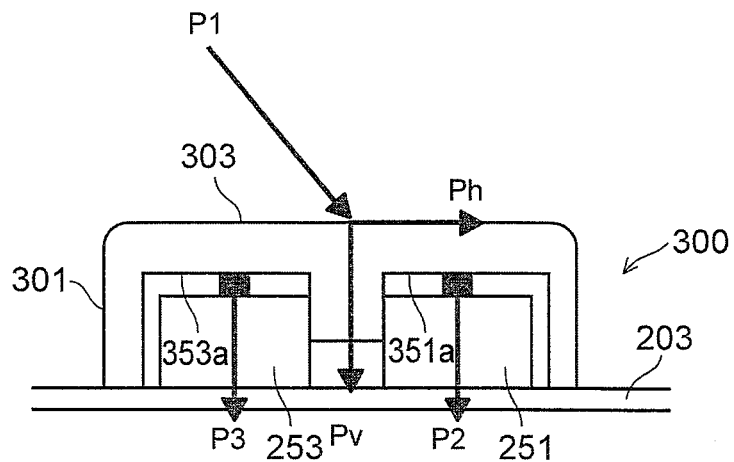
FIGS. 4A-4C depict a relationship between depression pressure applied to an operation cover and pressures detected by the pressure sensors.

FIG. 4 contains views for describing a relationship between depression pressure applied to the operation cover 301 and pressures detected by the pressure sensors 251 and 253. FIG. 4A shows a state where a user presses down the original point of the operation surface 301 with depression pressure P1 including a horizontal component and a vertical component in the +X direction to move the mouse cursor 153 in the +X direction. The depression pressure P1 indicates pressure applied to the center of gravity of the power of the entire ball of the finger or the point of application on the operation surface 303. The depression pressure P1 can be decomposed into a horizontal component Ph and a vertical component Pv.

The direction of the horizontal component Ph reflects a direction in which the user wants to move the mouse cursor 153, and the magnitude of the horizontal component Ph reflects the moving speed. The vertical component Pv reflects a frictional force needed to apply the horizontal component Ph to the operation surface 303. When the operation surface 303 is pressed down with the depression pressure P1, the ceiling part 307 and the leg part 305 of the operation cover 301 are slightly distorted to displace the pressure faces 351a to 357a in the direction of the depression pressure P1. The amount of displacement of each of the pressure faces 351a to 357a differs in the distance from the point of application. Since the point of application is the original point in FIG. 4A, substantially identical vertical pressures P2 and P3 are applied to the pressure sensors 251 and 253 due to the displacement of the pressure faces 351a and 353a by the vertical component Pv.

Since the direction of displacement of the pressure faces 351a and 353a by the horizontal component Ph is perpendicular to the detection axis 259, it is not transmitted to the pressure sensors 251 and 253. Therefore, the system can generate no signal from the pressure sensors 251 and 253 to move the mouse cursor 153. The same holds true for the output of a pair of the pressure sensors 253 and 257.

Figure 4B:
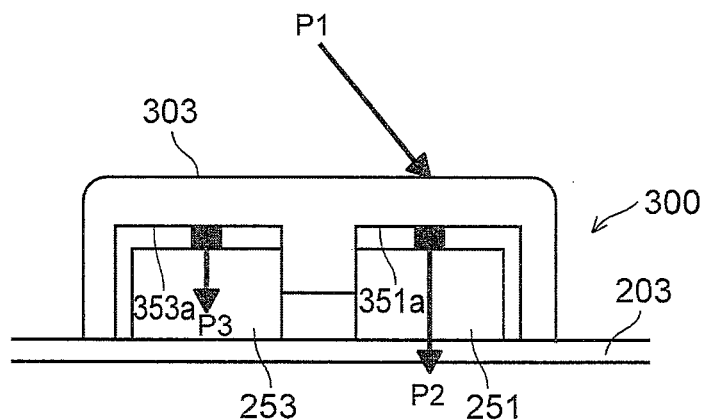

FIG. 4B shows a state where an intersection point between the X axis and the line X2 on the operation surface 303 is pressed down with the depression pressure P1. In this case, since the amount of vertical displacement of the pressure face 351a by the vertical component Pv is larger than that of the pressure face 353a, the pressure P2 applied to the pressure sensor 251 becomes greater than the pressure P3 applied to the pressure sensor 253. Therefore, the pointing device 300 can generate a signal for moving the mouse cursor in the +X direction. In this case, however, since there is a need to select and press down the point of application, the operational feeling is different from that of the strain gauge type pointing stick without the need to select the point of application.

Figure 4C:
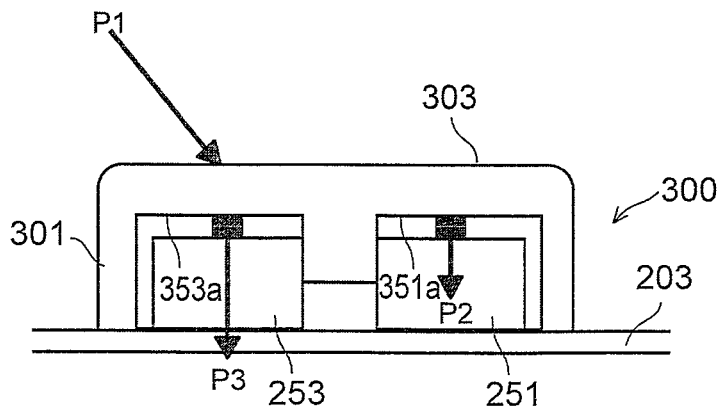
Figure 5A:
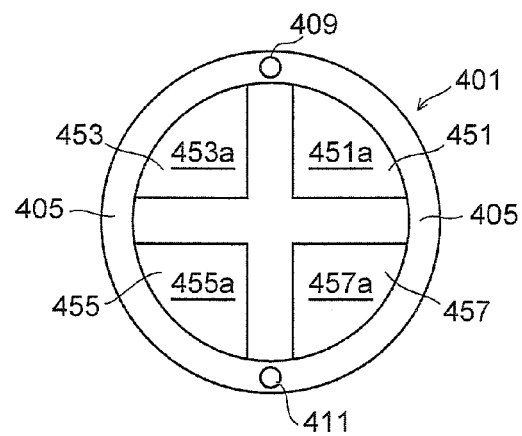
FIGS. 5A-5E illustrate the structure of a pressure sensor type pointing device.
Figure 5B:
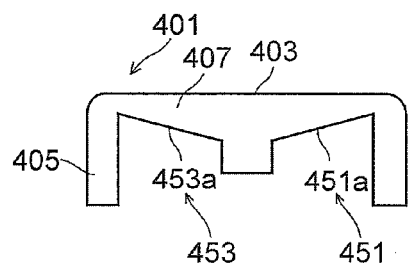
Figure 5C:
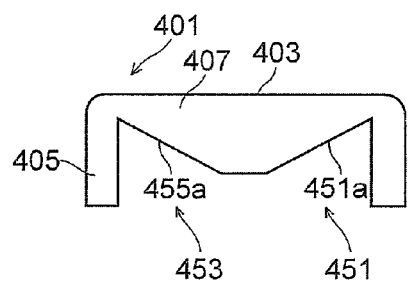
Figure 5D:
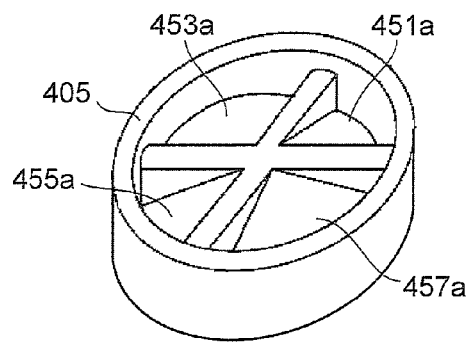
Figure 5E:
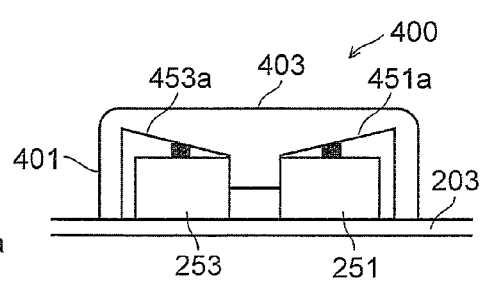

FIG. 4C shows a state where an intersection point between the X axis and the line X1 on the operation surface 303 is pressed down with the depression pressure P1. In this case, since the amount of vertical displacement of the pressure face 353a by the vertical component Pv is larger than that of the pressure face 351a, the pressure P3 applied to the pressure sensor 253 becomes greater than the pressure P2 applied to the pressure sensor 251. Therefore, the pointing device 300 generates a signal for moving the mouse cursor in the −X direction.

In this case, since the system generates a signal for moving the mouse cursor 153 in the −X direction despite the fact that the user has operated the pointing device 300 with intent to move the mouse cursor 153 in the +X direction, the operational feeling is contrary to the user's intention and different from that of the strain gauge type pointing stick. Although the entire height of the pointing device 300 can be lowered, since the pressure sensors 251 and 253 respond only to the vertical component Pv without responding to the horizontal component Ph, the system can generate no signal for operating the mouse cursor with an operational feeling similar to that of the strain gauge type.

Although the description has been made on the pressure sensors 251 and 253 in FIG. 4, the same holds true for the relationship between depression pressure and pressures detected by the pressure sensors 255 and 257 when any position on the X axis is pressed down. When pressure is applied to a point on the line Y1, the pressure applied to the pair of pressure sensors 251 and 253 becomes greater than the pressure applied to the pair of pressure sensors 255 and 257, while when pressure is applied to a point on the line Y2, the result is reversed. When pressure is applied to any point of application, the pressure applied to the pressure sensors 251 to 257 is changed depending on the positional relation between the point of application and the pressure faces 351a to 357a, the material and shape of the operation cover, and the like. It can be readily understood that an operational feeling similar to that of the strain gauge type cannot be obtained.

FIG. 5 contains views for describing the structure of a pressure sensor type pointing device 400 mountable as the pointing device 200 in FIG. 1. FIG. 5A is a plan view of the reverse face of an operation cover 401 as seen from the side of the PCB 203, FIG. 5B is a sectional view taken along the line Y1 (FIG. 2), FIG. 5C is a sectional view taken along the line C1 (FIG. 2), FIG. 5D is a perspective view as seen from the backside, and FIG. 5E is a sectional view of the pointing device 400 with the pressure sensors 251 to 257 covered with the operation cover 401.

The operation cover 401 includes a ceiling part 407 with an operation surface 403 and pressure faces 451a to 457a formed thereon, a leg part 405 with screw holes 409 and 411 formed therein, and storage parts 451 to 457. Each of the pressure faces 451a to 457a is a plane inclined to rise from the periphery to the original point on the reverse face. Therefore, normal lines to the pressure faces 451a to 457a approach one another above the operation surface 403. FIG.

5D shows a state where the inclined planes 451a to 457a are inclined to rise from the periphery to the original point. The detection axis 259 of each of the pressure sensors 251 to 257 is directed in the vertical direction.

Although the material of the operation cover 401 does not really matter as long as the operation cover 401 has such a shape that the pressure faces 451a to 457a will be slightly displaced in the direction of the depression pressure P1 under the depression pressure P1 applied to the operation surface 403, aluminum alloy or magnesium alloy is employed in the embodiment. Further, each tip of the rods 251a to 257a of the pressure sensors 251 to 257 is processed to form a pressure-receiving face fitting with each of the pressure faces 451a to 457a in an assembled state.

Figure 6A:
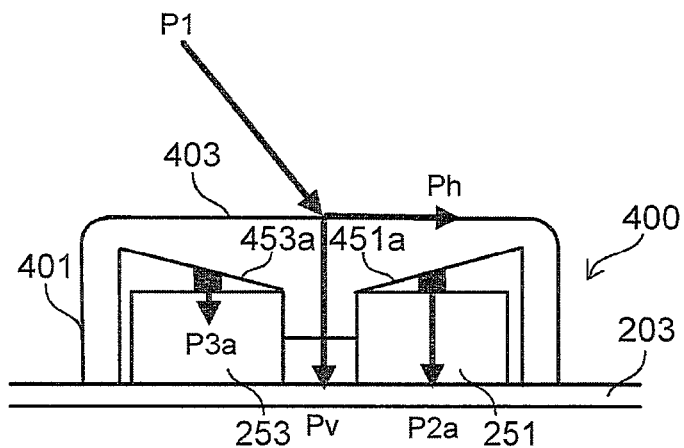
FIGS. 6A-6C show a relationship between depression pressure applied to an operation cover and pressures detected by two pressure sensors.

FIG. 6 contains views for describing a relationship between the depression pressure P1 applied to the operation cover 401 and pressures detected by the pressure sensors 251 and 253. FIG. 6A shows a state of applying the depression pressure P1 to the same point of application on the operation surface 403 as in the case of FIG. 4A. When the operation surface 403 is pressed down with the depression pressure P1, the ceiling part 407 and the leg part 405 of the operation cover 401 are slightly distorted to displace the pressure faces 451a to 457a in the direction of the depression pressure P1. Since the point of application of the depression pressure P1 is the original point, the pressure faces 451a and 453a are slightly displaced in the direction of the depression pressure P1 in substantially the same way.

Figure 7A:
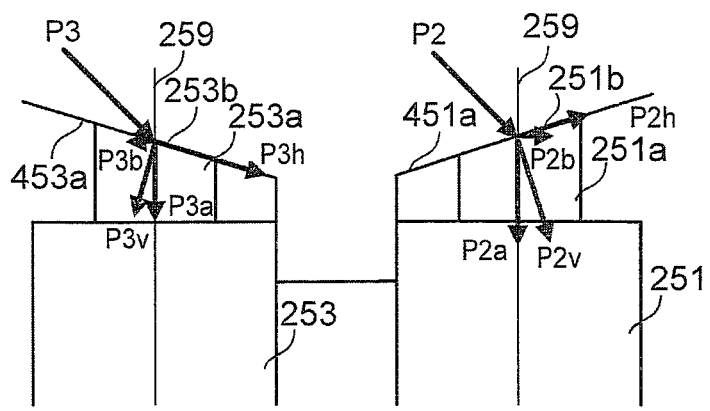
FIGS. 7A-7C depict pressures detected by two pressure sensors.
Figure 7B:
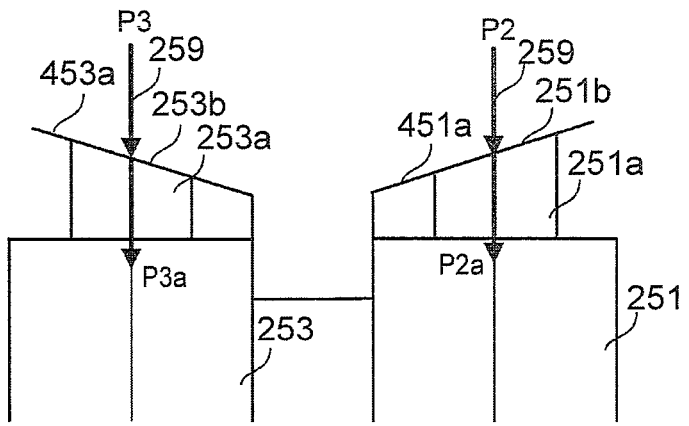

A state where the depression pressure P1 propagates through the pressure sensors 251 and 257 at this time will be described with reference to FIG. 7. FIG. 7A shows a state when the depression pressure P1 is applied to the operation surface 401, and FIG. 7B shows a state when depression pressure that does not include the horizontal component Ph is applied to the operation surface 401. It is assumed in FIG. 7A that pressures P2 and P3 are applied to points of application of the pressure-receiving faces 251b and 253b of the rods 251a and 253a due to the displacement of the pressure faces 451a and 453a, respectively. Since the pressures P2 and P3 are directed in the same direction as the depression pressure P1, and the point of application of the depression pressure P1 is the original point, it can be considered that both pressures have almost the same magnitude.

The pressures P2 and P3 can be decomposed into components P2h and P3h parallel to the pressure-receiving faces 251b and 253b, and components P2v and P3v perpendicular to the pressure-receiving faces 251b and 253b, respectively. The horizontal components P2h and P3h do not contribute to the pressures detected by the pressure sensors 251 and 253. The vertical components P2v and P3v can be decomposed into components P2a and P3a parallel to the detection axis 259 and components P2b and P3b perpendicular to the detection axis 259.

The vertical components P2b and P3b do not contribute to the pressures detected by the pressure sensors 251 and 253. In the end, the components that contribute to the pressures detected by the pressure sensors 251 and 253 are the components P2a and P3a acting in the direction of the detection axis 259. Here, since an angle formed by the direction of the pressure P2 and the normal line to the pressure face 451a is smaller than an angle formed by the direction of the pressure P3 and the normal line to the pressure face 453a, pressure transmitted to the pressure-receiving face 251b of the pressure sensor 251 by the pressure face 451a is greater than pressure transmitted by the pressure face 453a. Thus, since the pressure detected by the pressure sensor 251 becomes greater than the pressure detected by the pressure sensor 253, the pointing device 400 can generate a signal reflecting the user's intention to move the mouse cursor in the X direction like the strain gauge type pointing stick.

When the original point is pressed down with depression pressure P1 including only the vertical component Pv as shown in FIG. 7B, since substantially identical pressures P2a and P3a are applied to the pressure sensors 251 and 253, the system cannot generate a signal for moving the mouse cursor in any direction. However, the system can generate a signal for moving the mouse cursor 153 in the direction of the horizontal component Ph according to the horizontal component Ph of the depression pressure P1 applied to the operation surface 403.

Figure 6B:
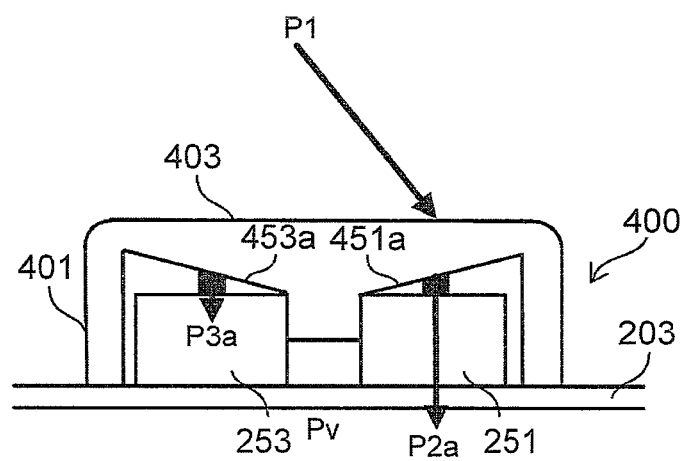
Figure 6C:
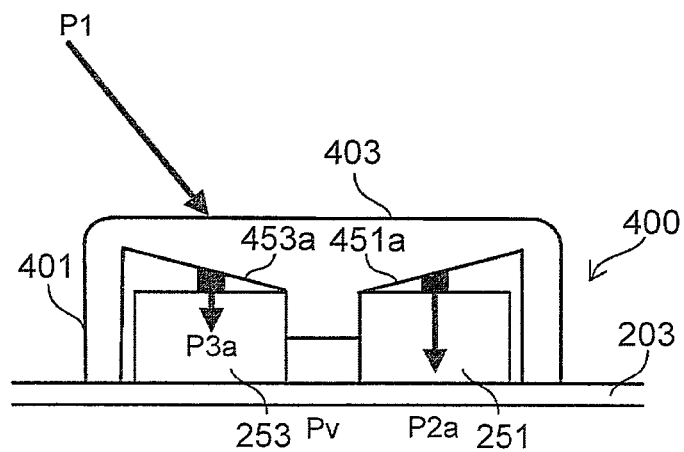

FIG. 6B shows a state when the depression pressure P1 is applied to the same point of application on the operation surface 403 as in the case of FIG. 4B. In this case, since the amount of displacement of the pressure face 451a in the vertical direction is greater than that of the pressure face 453a, the pressure P2a applied to the pressure sensor 251 becomes even greater than the pressure P3a applied to the pressure sensor 253 compared with the case of FIG. 4A. FIG. 6C shows a state when the depression pressure P1 is applied to the same point of application on the operation surface 403 as in the case of FIG. 4C. In this case, although the amount of displacement of the pressure face 453a in the vertical direction is greater than that of the pressure face 451a, the pressure applied to the pressure sensor 251 by the pressure face 451a becomes greater than the pressure applied to the pressure sensor 253 by the pressure face 453a due to the directions of the pressures P2 and P3, and the relation of angles between the normal lines to the pressure faces 451a, 453a and the detection axis 259.

Figure 7C:
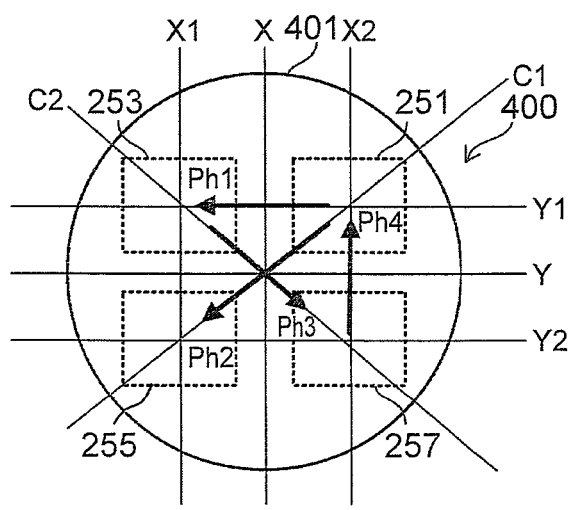

Even when any position on the X axis is pressed down with depression pressure P1 including the horizontal component Ph in the +X direction, the pointing device 400 is such that the pressure sensor 251 detects greater pressure than the pressure sensor 253. It can also be understood that the pressure sensor 253 will detect greater pressure than the pressure sensor 251 if the direction of the horizontal component Ph is reversed to the −X direction. FIG. 7C is a view for describing the magnitude of pressure detected by each of the pressure sensors 251 to 257 when depression pressure with a horizontal component Ph directed in various directions is applied to various points of application on the operation surface 403. When any point of application on the line Y1 of the operation surface 401 is pressed down with depression pressure including a horizontal component Ph1 directed from the pressure sensor 251 to the pressure sensor 253, the pressure sensor 253 detects pressure greater than that detected by the pressure sensor 251, and the pressure sensor 255 detects pressure greater than that detected by the pressure sensor 257.

When any point of application on the line C1 of the operation surface 401 is pressed down with depression pressure including a horizontal component Ph2 directed from the pressure sensor 251 to the pressure sensor 255, the pressure sensor 255 detects pressure greater than that detected by the pressure sensor 251, and the pressure sensors 253 and 257 detect substantially the same pressure. When any point of application on the line C2 of the operation surface 401 is pressed down with depression pressure including a horizontal component Ph3 directed from the pressure sensor 253 to the pressure sensor 257, the pressure sensor 257 detects pressure greater than that detected by the pressure sensor 253, and the pressure sensors 251 and 255 detect substantially the same pressure. When any point of application on the line X2 of the operation surface 401 is pressed down with depression pressure including a horizontal component Ph4 directed from the pressure sensor 257 to the pressure sensor 251, the pressure sensor 251 detects pressure greater than that detected by the pressure sensor 257, and the pressure sensor 253 detects pressure greater than that detected by the pressure sensor 255.

Since the pressure faces 451a to 457a are inclined from the periphery to the original point, the present invention is not limited to these typical examples. When the user presses down any position on the operation surface 401 with depression pressure including a horizontal component Ph directed in a direction in which the user wants to move the mouse cursor, since the pressure sensor located at the destination detects greater pressure than the pressure sensor located at the position as the starting point, the system can generate a signal for moving the mouse cursor 153 from the output of the four pressure sensors. The pointing device 400 is such that the system can output a signal for moving the mouse cursor in the direction of the horizontal component Ph even if any position is the point of application on the operation surface 403, and this can give the user the same operational feeling as the strain gauge type pointing stick.

The user can also change the vertical component for pressing down the operation surface 403. The pointing device 400 can detect the vertical component Pv of the depression pressure P1 as the lowest value among those of pressures detected by the four pressure sensors 251 to 257, or an average or total value of the four values. The pointing device 400 can generate a signal from the vertical component Pv of the depression pressure P1, where the intended use of the signal is different from a signal using the horizontal component Ph.

Figure 8:
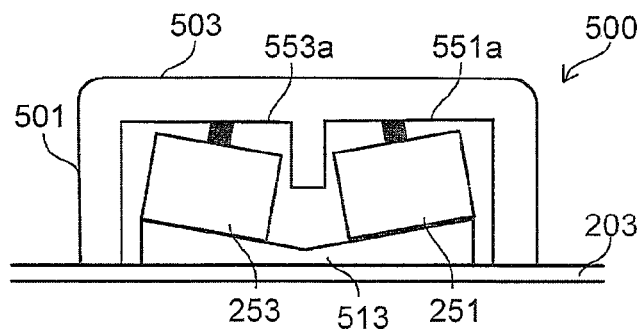
FIG. 8 is a sectional view for describing the structure of a pressure sensor type pointing device.

FIG. 8 is a sectional view for describing the structure of a pressure sensor type pointing device 500 mountable as the pointing device 200 in FIG. 1. The pointing device 500 is such that pressure faces 551a to 557a (only 551a and 553a are shown in FIG. 8) are made horizontal but the pressure sensors 251 to 257 (only 251 and 253 are shown in FIG. 8) are mounted on a tilting table 513 so that the detection axes 259 will approach one another above an operation surface 503. The pointing device 500 can also respond to the horizontal component Ph to give the user the same operational feeling as the strain gauge type pointing stick.

Figure 9:
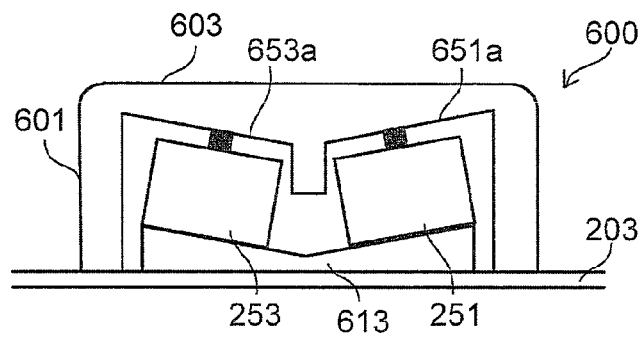
FIG. 9 is a sectional view for describing the structure of a pressure sensor type pointing device.

FIG. 9 is a sectional view for describing the structure of a pressure sensor type pointing device 600 mountable as the pointing device 200 in FIG. 1. The pointing device 600 is such that pressure faces 651a to 657a (only 651a and 653a are shown in FIG. 9) are so inclined that respective normal lines will approach one another above an operation surface 603 and the pressure sensors 251 to 257 (only 251 and 253 are shown in FIG. 9) are mounted on a tilting table 613 so that the detection axes 259 will approach one another above the operation surface 603. The pointing device 600 can show even greater sensitivity to the horizontal component Ph than the pointing devices 400 and 500 to give the user the same operational feeling as the strain gauge type pointing stick.

Figure 10:
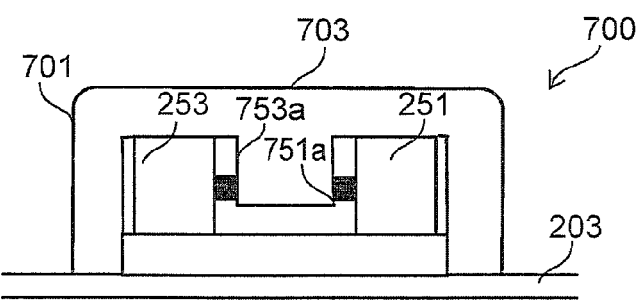
FIG. 10 is a sectional view for describing the structure of a pressure sensor type pointing device.

FIG. 10 is a sectional view for describing the structure of a pressure sensor type pointing device 700 mountable as the pointing device 200 in FIG. 1. The pointing device 700 is such that pressure faces 751a to 757a (only 751a and 753a are shown in FIG. 10) are made perpendicular and the pressure sensors 251 to 257 (only 251 and 253 are shown in FIG. 10) are mounted sideways to make the detection axes 259 horizontal. The pointing device 700 can show even greater sensitivity to the horizontal component than the pointing devices 400, 500, and 600 to give the user the same operational feeling as the strain gauge type pointing stick.

Each of the operation covers 401 to 701 may be formed by processing metal, or entirely formed out of an elastic material by pasting a rigid plate material on the pressure faces. Alternatively, the operation cover may be formed out of a complex material made up by combining multiple materials to obtain appropriate displacement. The leg part of each of the operation covers 401 to 701 supports the overall operation cover with respect to the PCB 203, and imparts displacement to the pressure faces. Only the center of the operation cover may be used as this leg part. Further, the operation surface may be covered with silicon rubber with a projection formed thereon to increase friction or make the finger easy to come off.

Figure 11:
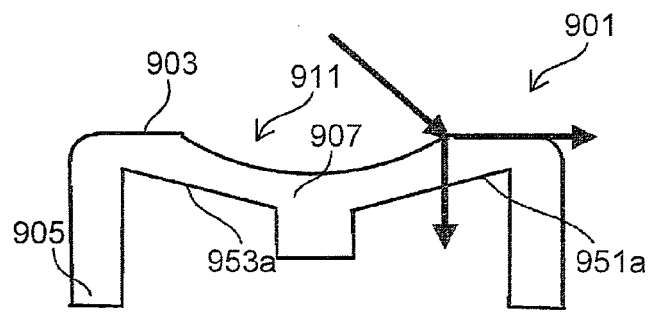
FIG. 11 is a view showing an example of the structure of an operation surface.

FIG. 11 shows an operation cover 901 with a recess 911 formed in an operation surface 903, where the recess 911 has a planarly round shape and is concave in a lens shape. The recess 911 can directly receive the horizontal component Ph when the depression pressure P1 does not include the vertical component Pv. Further, since the recess 911 guides the finger so that the point of application will come right above a pressure sensor located in the direction of moving the mouse cursor 153, the pressure sensor located just below the moving direction works to detect great pressure.

Figure 12A:
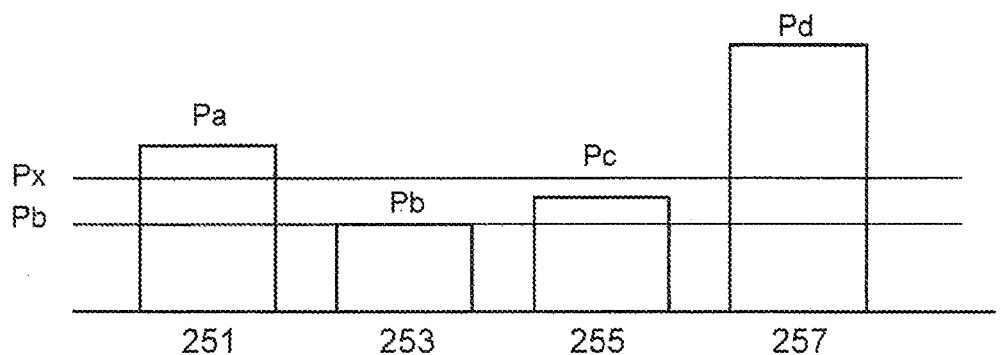
FIGS. 12A-12B are charts for describing an example of a method of generating a signal for controlling a computer using a horizontal component and a vertical component of depression pressure.

FIG. 12 contains charts for describing an example of a method of generating a signal for controlling a computer using a horizontal component and a vertical component of depression pressure. In the pointing devices 400, 500, and 600, the pressure sensors 251 to 257 detect pressures corresponding to the depression pressure P1 including the horizontal component Ph and the vertical component Pv, respectively. The horizontal component Ph of the depression pressure P1 can be detected as a vector value of pressure detected by a pressure sensor located in the direction of the horizontal component Ph, and the vertical component Pv can be detected as the lowest pressure among those detected by the four pressure sensors, or as a total or average value of four pressures. Suppose now that the pressure sensors 251 to 257 detect pressures Pa to Pd as shown in FIG. 12A.

Figure 12B:
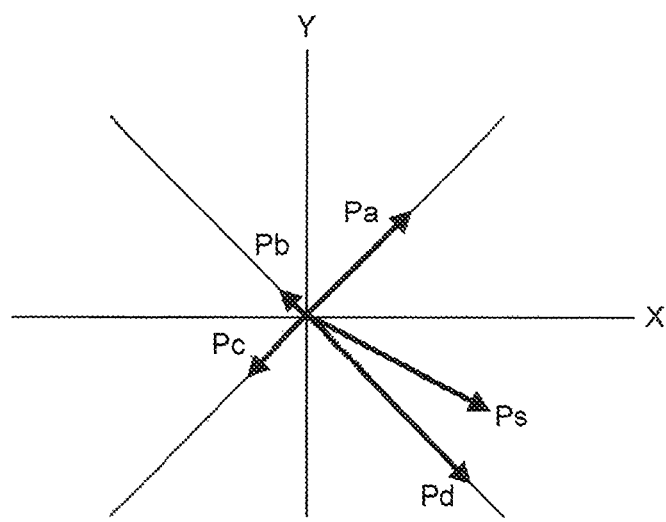

A signal processing circuit mounted on the PCB 203 calculates a resultant vector Ps from the detected pressures Pa to Pd as shown in FIG. 12B. Then, the signal processing circuit can generate a signal indicating the moving direction of the mouse cursor 153 from the direction of the resultant vector Ps and indicating the amount of travel (moving speed) from the magnitude of the resultant vector Ps. When the lowest pressure Pb exceeds a threshold value Px, the signal processing circuit can determine that the user intends to perform a special operation because the vertical component Pv exceeds a value for obtaining friction needed for the horizontal component Ph. This signal can be, for example, used to be added to the amount of travel of the mouse cursor 153 obtained by the vector calculation or used for a click operation at the position of the mouse cursor 153.

As has been described, the present disclosure provides a pointing device for a portable computer.

While the disclosure has been particularly shown and described with reference to a preferred embodiment, it will be understood by those skilled in the art that various changes in form and detail may be made therein without departing from the spirit and scope of the disclosure.

What is claimed is:
1. A pointing device comprising:
   a display;
   a keyboard assembly, coupled to said display, having a plurality of key switches; and a pointing device located amongst said key switches, wherein said pointing device includes
    a plurality of pressure sensors, each having a detection axis and arranged in a radial manner about an original point;
    an operation cover having an operation surface and a plurality of pressure faces, wherein said operation surface is to receive depression pressure from a user, wherein each of said pressure faces is arranged to correspond to one of said pressure sensors such that each of said pressure sensors can receive an appropriate amount of pressure from a corresponding one of said pressure faces according to a direction and magnitude of said depression pressure being applied to said operation cover in relation to said original point, wherein one of said pressure sensors includes a rod in close proximity to one of said pressure faces.

2. The portable computer of claim 1, wherein said magnitude of said depression pressure includes a vertical component and a horizontal component.

3. The portable computer of claim 1, wherein one of said pressure sensors includes a piezoelectric element to output a voltage signal corresponding to said depression pressure.

4. The portable computer of claim 1, wherein a first one and a second one of said pressure sensors are disposed on a first line parallel to an X-axis, and a third one and a fourth one of said pressure sensors are disposed on a second line parallel to said X-axis.

5. The portable computer of claim 4, wherein said first and third ones of said pressure sensors are disposed on a first line parallel to a Y-axis, and said second and fourth ones of said pressure sensors are disposed on a second line parallel to said Y-axis.

* * * * *